(12) United States Patent
Bernosky

(10) Patent No.: US 6,982,638 B2
(45) Date of Patent: Jan. 3, 2006

(54) SELF-CANCELING TURN SIGNAL

(75) Inventor: John David Bernosky, Ashland, PA (US)

(73) Assignee: Mack Trucks, Inc., Allentown, PA (US)

( * ) Notice: Subject to any disclaimer, the term of this patent is extended or adjusted under 35 U.S.C. 154(b) by 135 days.

(21) Appl. No.: 10/730,037

(22) Filed: Dec. 9, 2003

(65) Prior Publication Data
US 2005/0122215 A1 Jun. 9, 2005

(51) Int. Cl.
B60Q 1/40 (2006.01)
(52) U.S. Cl. .................. 340/476; 340/477; 362/498; 200/61.3; 701/36
(58) Field of Classification Search ............... 340/476, 340/477; 701/36, 70–92; 200/61.3, 61.31; 362/498
See application file for complete search history.

(56) References Cited

U.S. PATENT DOCUMENTS

| 4,030,066 | A |   | 6/1977  | White          |         |
|-----------|---|---|---------|----------------|---------|
| 4,213,116 | A |   | 7/1980  | Holtzman et al.|         |
| 4,358,751 | A |   | 11/1982 | Roudebush, Jr. |         |
| 5,528,218 | A | * | 6/1996  | Rigsby         | 340/475 |
| 6,020,813 | A |   | 2/2000  | Harris et al.  |         |
| 6,204,759 | B1| * | 3/2001  | Jahnke         | 340/476 |
| 6,876,300 | B2| * | 4/2005  | Ponziani       | 340/476 |

* cited by examiner

Primary Examiner—Daniel Wu
Assistant Examiner—Travis Hunnings
(74) Attorney, Agent, or Firm—Rothwell, Figg, Ernst & Manbeck, PC

(57) ABSTRACT

A self-canceling turn signal includes an inner wheel rotating at an inner velocity and an outer wheel rotating at an outer velocity. An inner rotational velocity of the inner wheel and an outer rotational velocity of the outer wheel may be measured and compared, and a turn signal may be responsive to a differential signal substantially proportional to the difference between the inner and the outer rotational velocities. The turn signal may signal a turn while the differential signal is greater than a predetermined differential signal.

20 Claims, 4 Drawing Sheets

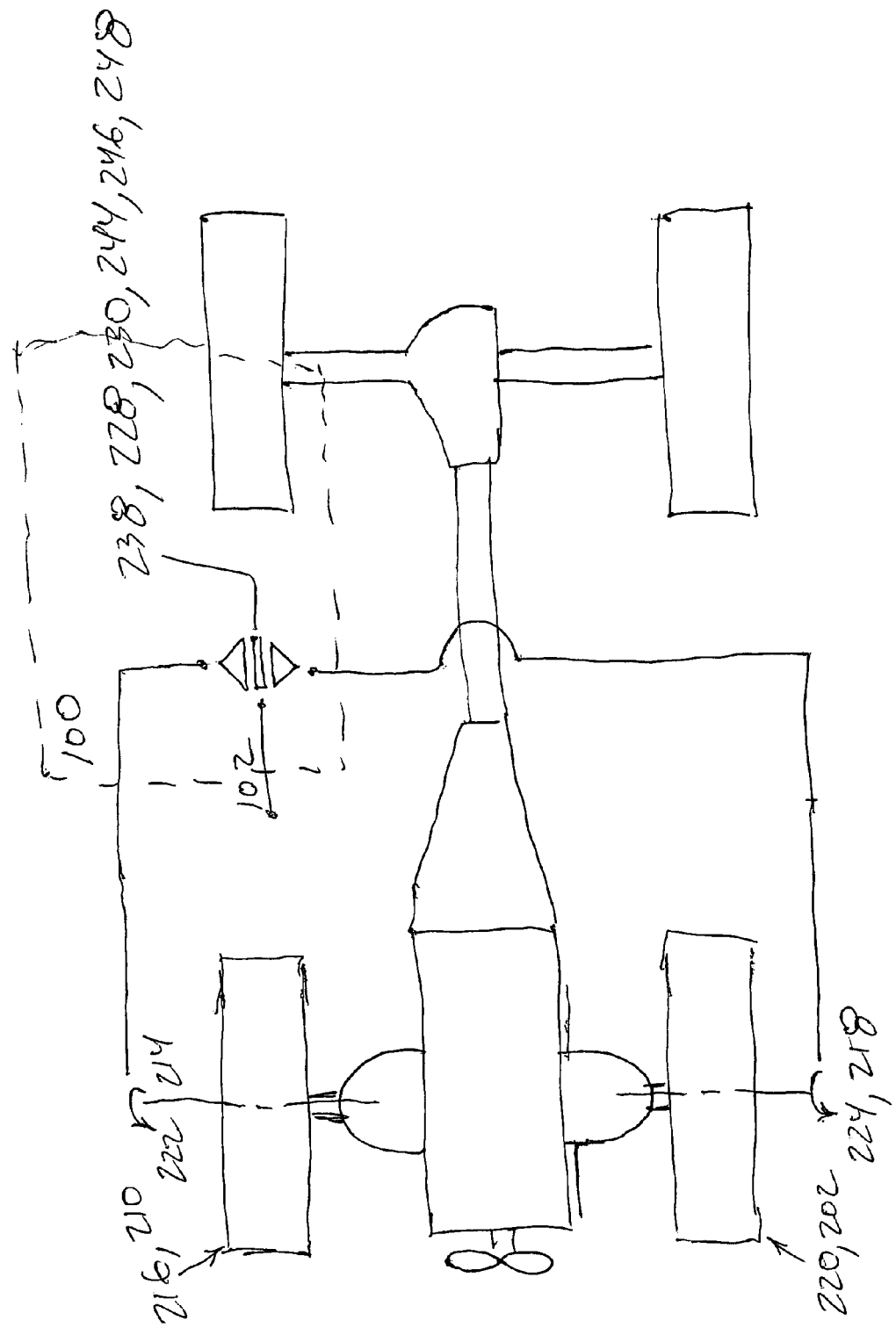

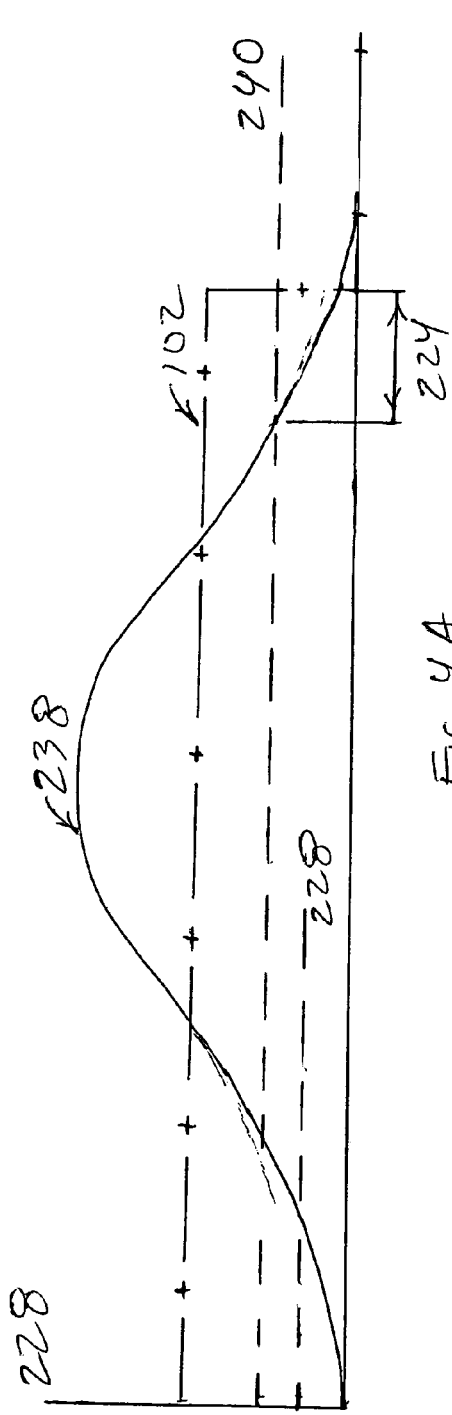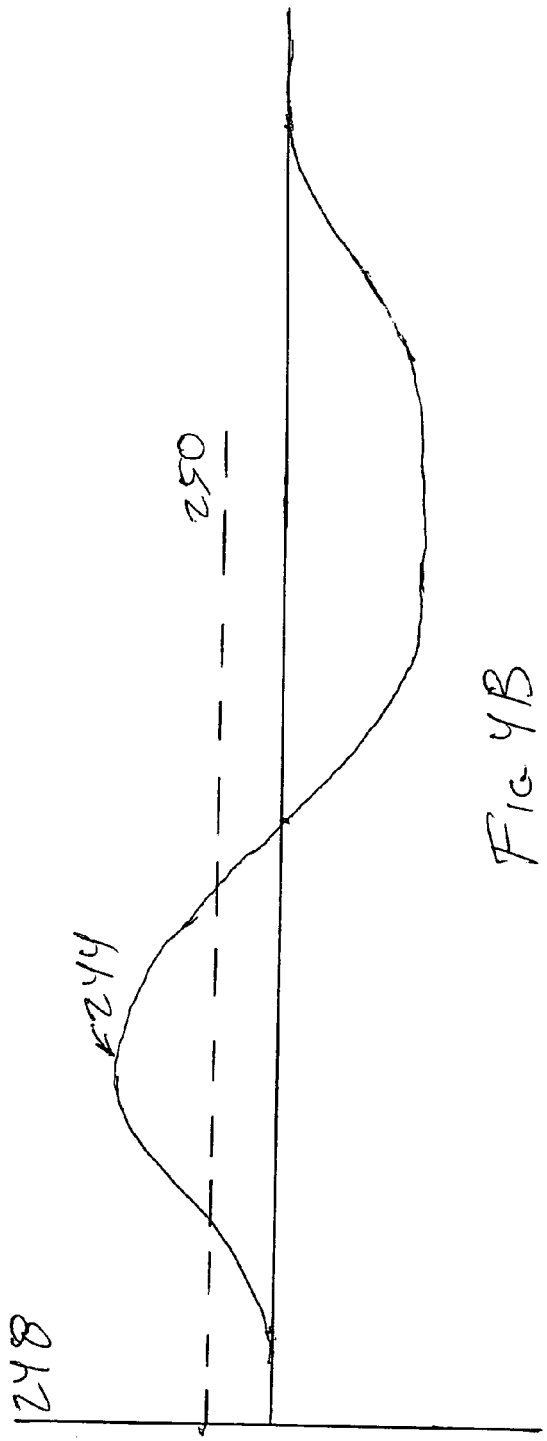

SELF-CANCELING TURN SIGNAL

FIELD OF THE INVENTION

The invention relates to self-cancelling turn signals and, in particular, to self-cancelling turn signals triggered by an ABS turn detection signal.

DESCRIPTION OF THE RELATED ART

Turn signals are used in vehicles to signal turns. A driver sets a turn signal to indicate an intention to turn the vehicle. Turn signals are often interlocked mechanically with the steering gear so that the turn signals are released automatically upon completion of the turn. The interlock may take the form of a mechanical contact on the steering column integrated with the turn signal switch.

The mechanical interlock often requires a minimum rotation of the steering gear to trigger the release. A turn of less than the minimum may not trigger the release, leaving the turn signals on. Furthermore, a vehicle such as a truck pulling a trailer may commence a wide turn by turning initially in the opposite direction of the intended turn. In this case the interlock may extinguish the signal prior to completion of the turn.

Turn signals may be timed to release automatically as well. Since a timer may release the signal after a predetermined amount of time has elapsed, it is possible that the signal could be extinguished prior to making the turn, or long after the turn was completed.

SUMMARY OF THE INVENTION

In a first aspect of the invention, a self-canceling turn signal includes an inner wheel rotating at an inner velocity, an outer wheel rotating at an outer velocity, a differential signal substantially proportional to a difference between the inner and outer velocities, and a turn signal responsive to the differential signal, and in which the turn signal signals a turn while the differential signal is greater than a predetermined differential signal.

In a second aspect of the invention, a method of self-canceling a turn signal includes measuring an inner rotational velocity of an inner wheel, measuring an outer rotational velocity of an outer wheel, comparing a difference between the inner and outer velocities to a predetermined difference, and canceling a turn signal if the difference is less than the predetermined difference.

In a third aspect of the invention, a system of self-canceling a turn signal includes means for measuring an inner rotational velocity of an inner wheel, means for measuring an outer rotational velocity of an outer wheel, means for comparing a difference between the inner and outer velocities to a predetermined difference, and means for canceling a turn signal if the difference is less than the predetermined difference.

BRIEF DESCRIPTION OF THE SEVERAL VIEWS OF THE DRAWINGS

FIG. 3 is a top view of a self-canceling turn signal system incorporated in a vehicle according to a third embodiment of the invention; and FIG. 4 is a graph of differential signals for use with an embodiment of the invention.

DETAILED DESCRIPTION OF THE PREFERRED EMBODIMENTS

It would be desirable for turn signals to be extinguished upon completion of a turn. Since a vehicle may turn for a variable amount of time, it would be desirable for a completion of the turn to be identified reliably. Since a vehicle may begin a turn in a direction opposite to the intended direction, it would be desirable for the turn signal to remain on during the initial part of the turn.

Figure 1:
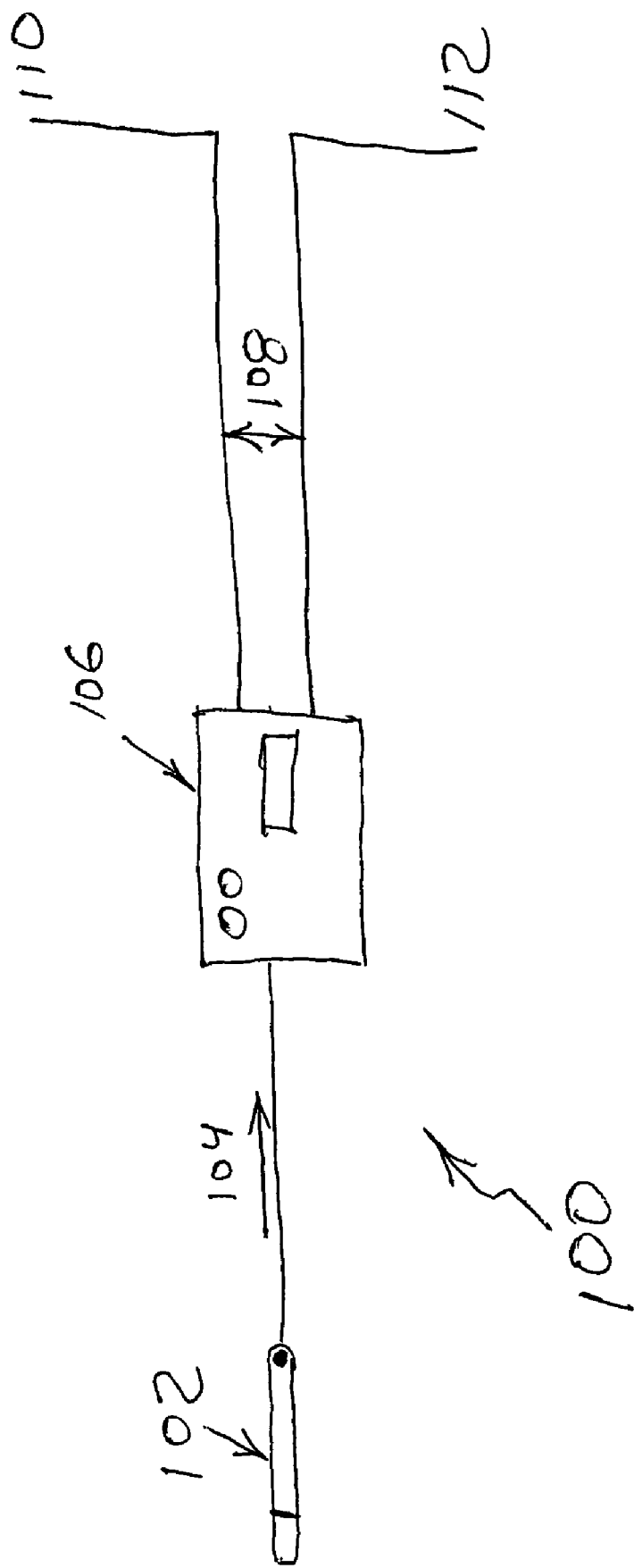
FIG. 1 is schematic of a self-canceling turn signal system according to a first embodiment of the invention.

In a first embodiment, shown in FIG. 1, a self-canceling turn signal system 100 includes a turn signal 102 which may be a momentary switch. Turn signal 102 may supply an input 104 to a computer 106. In several embodiments, computer 106 may be an engine control module (ECM) or a powertrain control module (PCM). Input 104 may indicate when a driver has asserted turn signal 102.

Signals 110, 112 may also be available to computer 106. Signals 110, 112 may represent wheel speeds, such as rotation speeds of a pair of wheels. In one embodiment, signals 110, 112 may be available from an antilock brake system (ABS).

In one embodiment, an ABS broadcasts wheel speeds in a parameter group numbered 62215 (00FEBF16). The ABS may repeat the broadcast every 100 ms. In one embodiment, the data may be broadcast in a length of 8 bytes, and in PDU Format: 254, with PDU specific: 191 and Default priority: 6.

In this embodiment, bytes 1 and 2 may represent a front axle speed, byte 3 a Front Axle Left Wheel speed, byte 4 a Front Axle Right Wheel speed, byte 5 a Rear Axle #1 Left Wheel speed, byte 6 a Rear Axle #1 Right Wheel speed, byte 7 a Rear Axle #2 Left Wheel speed, and byte 8 a Rear Axle #2 Right Wheel speed.

In one embodiment, a driver may toggle turn signal 102 either to the left or the right to signal a turn. In this embodiment turn signal 102 may remain asserted, and the turn signal lights may flash, until a differential 108 between signals 110, 112 indicates a turn in that direction has begun. The turn signal lights may continue flashing until differential 108 between signals 110, 112 has ceased to exist, indicating that the turn has been completed. The turn signal lights may then be extinguished.

In one embodiment, the turn signal 102 may be canceled by indicating a turn in the opposite direction. This may be necessary if the driver begins to turn and then decides not to make the turn. In this embodiment, the turn signal lights may be extinguished if computer 106 has received an input 104 but has not sensed differential 108 between signals 110, 112 prior to receiving another input 104.

In one embodiment, a lane change could be accomplished by holding turn signal 102 in the direction of lane change. In this embodiment, the turn during the lane change may be too small to produce a differential 108 between signals 110, 112 large enough for computer 106 to measure. In the alternative, a threshold difference may be made larger than differential 108 between signals 110, 112 that is likely to occur during the lane change.

In one embodiment, the system may be programmed to extinguish the turn signal immediately upon release of turn signal 102 if it has been held in a turn direction for a set period of time. In one embodiment this period of time may be about two seconds.

Figure 2:
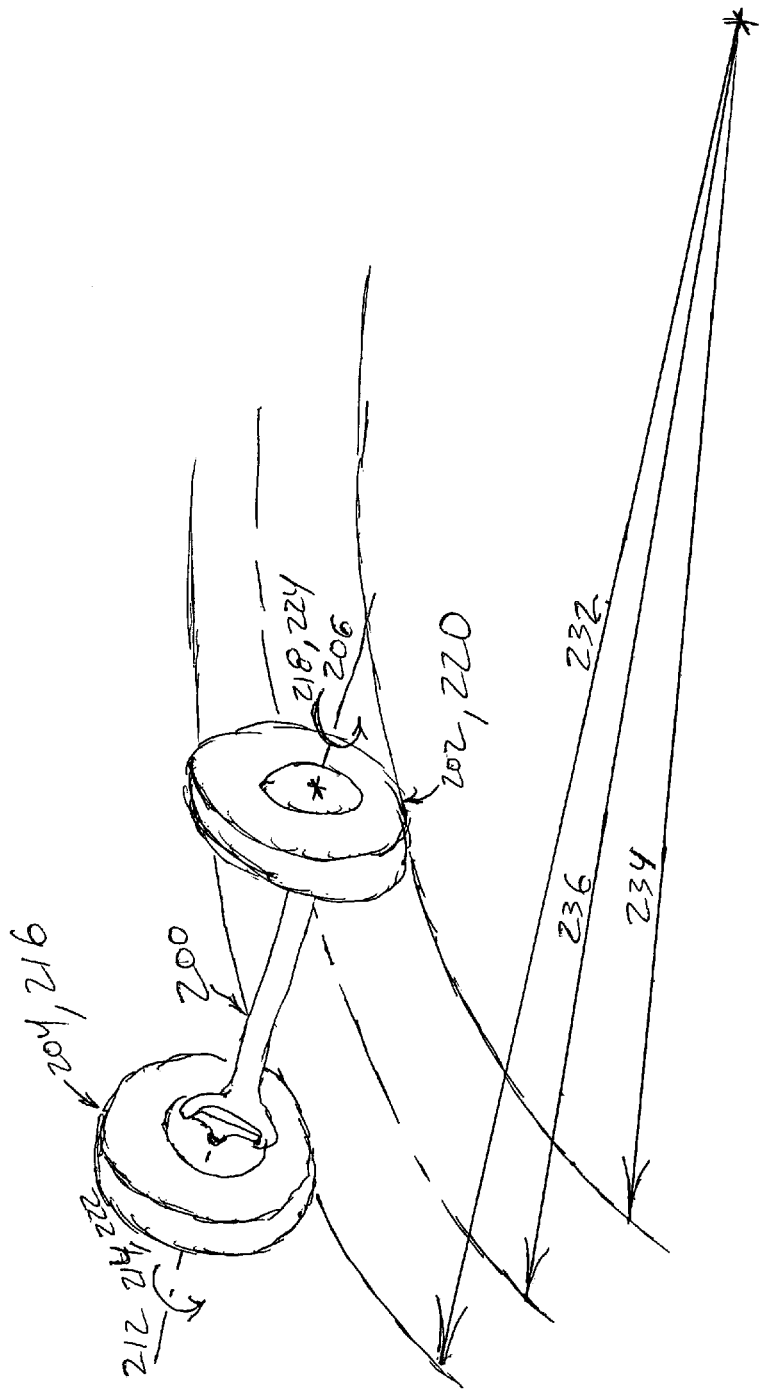
FIG. 2 is a three-quarter of an axle assembly according to a second embodiment of the invention.

In a second embodiment, shown in FIG. 2, an axle 200 for a vehicle includes a driver's side wheel 202 and a passenger's side wheel 204. Driver's side wheel 202 may rotate about a driver's side wheel bearing axis 206 at a driver's side wheel rotational velocity 218. Driver's side wheel rotational velocity 218 may be measured in radians per second (rad/s). Passenger's side wheel 204 may rotate about a passenger's side wheel bearing axis 212 at a passenger's side wheel rotational velocity 214, which may also be measured in rad/s.

If the vehicle negotiates a turn, an outer wheel 216 may travel further than an inner wheel 220, as shown in FIG. 2. Outer wheel 216 may travel further than inner wheel 220 because a radius of curvature 232 of outer wheel 216 may be larger than a radius of curvature 234 of inner wheel 220. An outer rotational velocity 222 of outer wheel 216 may thus need to be greater than an inner rotational velocity 224 of inner wheel 220 in order for outer wheel 216 to travel further than inner wheel 220 during the turn.

In particular, in the case of a left-hand-drive vehicle turning left as shown in FIG. 2, passenger's side wheel 204 may be outer wheel 216. Rotational velocity 214 of passenger's side wheel 204, which would be outer rotational velocity 222 in this case, may thus be higher than rotational velocity 218 of driver's side wheel 202, which would be inner rotational velocity 224 while the vehicle is turning left. In one embodiment, the respective identities of inner wheel 220 and outer wheel 216 may be identified by a direction of turn signal 102.

The reverse may be true in the case of a right turn. Driver's side wheel 202 would be the outer wheel. The rotational velocity 218 of driver's side wheel 202, which would be the outer rotational velocity, may thus be higher than the rotational velocity 214 of passenger's side wheel 204, which would be the inner rotational velocity while the vehicle is turning right.

In one embodiment, the vehicle may travel at 20 mph while negotiating a 45° turn. In particular, if the vehicle turns through a 45° curve with a radius of curvature 236 of twenty-four feet at a speed of twenty miles per hour (mph), the vehicle will spend [45°/360°*2*Π*24 feet]/[20 miles/hour*5,280 feet/mile* hour/3600 seconds]=0.643 seconds negotiating the turn.

If the vehicle is about eight feet wide, inner wheel 220 will traverse an arc with radius of curvature 234 of twenty feet, while outer wheel 216 traverses an arc with radius of curvature 232 of twenty-eight feet. Inner wheel 220 thus covers 45°/360°*2*Π*20 feet=15.708 feet in the time it takes to complete the turn, resulting in a speed over the ground of inner wheel 220 of 15.708 feet/0.643 seconds=24.429 feet/second or 24.429 feet/second*mile/5280 feet*3600 seconds/hour=16.656 mph.

Outer wheel 216 may traverse 45°/360°*2*Π*28 feet=21.991 feet, at a speed over the ground of 21.991 feet/0.643 seconds=34.201 feet/second or 34.201 feet/second*mile/5280 feet*3600 seconds/hour=23.319 mph, in the same period of time. There may thus be a 23.319 mph−16.656 mph=6.663 mph difference in ground speed between inner and outer wheels 220, 216 while the vehicle is turning. If inner and outer wheels 220, 216 were four feet in diameter, a rotation velocity 224 of inner wheel 220 will be 24.429 feet/second*2*Π*2 feet=306.984 radians/second, while a rotation velocity 222 of outer wheel 216 will be 34.201 feet/second*2*Π*2 feet=429.782 radians/second.

In a third embodiment, shown in FIG. 3, self-canceling turn signal system 100 may be incorporated in a vehicle 208. A turn of vehicle 208 may be identified by comparing the rotation velocities 224, 222 of inner and outer wheels 220, 216. In this embodiment inner wheel 220 may be the wheel closest to the center of the turn. The rotation velocities 224, 222 of the inner and outer wheels 220, 216 may be measured by ABS wheel speed sensors and compared to determine if a differential exists between them. A differential between the rotation velocities 224, 222 of the inner and outer wheels 220, 216 may indicate vehicle 208 is turning. Furthermore, the disappearance of a differential formerly existing may indicate that the turn has been completed.

In one embodiment, a differential signal 238 may be substantially proportional to a difference between rotational velocity 218 of driver's side wheel 202 and rotational velocity 214 of passenger's side wheel 204. Differential signal 238 may thus be indicative of a deviation of a vehicle from a straight line of travel, i.e. a turn.

A magnitude 228 of differential signal 238 may indicate a degree of curvature of the turn. Sharper turns, i.e. greater deviations from a straight line, may produce larger differences between inner and outer velocities 204, 208, and hence larger magnitudes 228.

In one embodiment, shown in FIG. 4A, a threshold magnitude 228 may indicate a minimum deviation from a straight line. In one embodiment, a predetermined differential signal 240 may be equal to this threshold. In one embodiment, turn signal 102 may be responsive to differential signal 238, such that turn signal 102 signals a turn while differential signal 238 is greater than predetermined differential signal 240.

In one embodiment, turn signal 102 signals a turn for a predetermined period of time 224 after differential signal 238 falls below predetermined differential signal 240.

In one embodiment, turn signal 102 may be canceled when differential signal 238 falls below predetermined differential signal 240. In one embodiment, cancellation of turn signal 102 may be deferred for a predetermined period of time 224 after differential signal 238 falls below predetermined differential signal 240.

A sign 230 of differential signal 238 may indicate a direction of the turn. If, for example, driver's side wheel 202 rotates faster than the passenger's side wheel 204, vehicle 208 may be turning right. In this case, sign 230 may be positive. The direction of turning indicated by sign 230 may not, however, be the global direction intended by a driver of vehicle 208. Rather, the driver may turn slightly to the left when entering a right turn, and then turn right to negotiate the turn.

The driver may do this if vehicle 208 is pulling a trailer, to avoid driving the rear wheels of the trailer over the sidewalk and obliterating lampposts, pedestrians, and the like. Thus, the identity of inner wheel 218 and outer wheel 216 may reverse during the turn. In one embodiment, turn signal 102 signals a turn even if differential signal 238 falls below predetermined differential signal 240 if sign 230 indicates a turn in a direction opposite to that indicated by turn signal 102.

Differential signal 238 may remain below predetermined differential signal 240 until the driver begins the turn. This may be the case if, for example, the driver has set a turn signal but has not begun turning the steering wheel. In one embodiment, cancellation of turn signal 102 may be deferred until differential signal 238 has risen above predetermined differential signal 240 at least once.

In one embodiment, shown in FIG. 4B, a rate of change signal 244 may be proportional to a rate of change 246 of differential signal 238. In one embodiment, rate of change signal 244 may have a sign 248. Sign 248 may, for example, indicate whether differential signal 238 has peaked. A change of sign 248 from positive to negative may, for example, indicate the extent of a turn.

In one embodiment, cancellation of turn signal 102 may be deferred while sign 248 is positive. In another embodiment, cancellation of turn signal 102 may be deferred if sign 248 returns to positive within a predetermined period of time after differential signal 238 has dipped below predetermined differential signal 240.

In one embodiment, cancellation of turn signal 102 may be deferred while rate of change signal 244 is greater than a predetermined rate of change signal 250. In one embodiment, turn signal 102 may be canceled after turn signal 102 has been asserted by a driver for a period of time longer than a predetermined period of time.

In a fourth embodiment, a method of self-canceling a turn signal 102 may include measuring an inner rotational velocity 224 of an inner wheel 220, measuring an outer rotational velocity 222 of an outer wheel 216, comparing a difference between inner and outer velocities 224, 222 to a predetermined difference 214, and canceling a turn signal 102 if difference is less than predetermined difference 214.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A self-canceling turn signal comprising:
    an inner wheel rotating at an inner velocity;
    an outer wheel rotating at an outer velocity;
    a differential signal substantially proportional to a difference between said inner and outer velocities; and
    a turn signal responsive to said differential signal, said turn signal signaling a turn while said differential signal is greater than a predetermined differential signal.

2. The self-canceling turn signal of claim 1, wherein said inner wheel is determined by a direction of the turn signal.

3. The self-canceling turn signal of claim 1, wherein said turn signal signals a turn for a predetermined period of time after said differential signal falls below said predetermined differential signal.

4. The self-canceling turn signal of claim 1, wherein said turn signal is canceled when said differential signal falls below said predetermined differential signal.

5. The self-canceling turn signal of claim 4, wherein cancellation of said turn signal is deferred for a predetermined period of time after said differential signal falls below said predetermined differential signal.

6. The self-canceling turn signal of claim 4, comprising further a rate of change signal proportional to a rate of change of said outer velocity relative to said inner velocity, said rate of change signal having a sign;
    wherein said cancellation of said turn signal is deferred while said sign is positive.

7. The self-canceling turn signal of claim 4, comprising further a rate of change signal proportional to a rate of change of said outer velocity relative to said inner velocity;
    wherein said cancellation of said turn signal is deferred while said rate of change signal is greater than a predetermined rate of change signal.

8. The self-canceling turn signal of claim 1, wherein said turn signal is canceled after said turn signal is asserted by a driver for a period of time longer than a predetermined period of time.

9. A method of self-canceling a turn signal comprising:
    measuring an inner rotational velocity of an inner wheel;
    measuring an outer rotational velocity of an outer wheel;
    comparing a difference between said inner and outer velocities to a predetermined difference; and
    canceling a turn signal if said difference is less than said predetermined difference.

10. The method of self-canceling a turn signal of claim 9, comprising further signaling a turn while said difference is greater than said predetermined difference.

11. The method of self-canceling a turn signal of claim 9, comprising further deferring said cancellation of said turn signal for a predetermined period of time after said difference falls below said predetermined difference.

12. The method of self-canceling a turn signal of claim 9, comprising further:
    measuring a rate of change of said outer velocity relative to said inner velocity;
    measuring a sign of said rate of change; and
    deferring said cancellation of said turn signal while said sign is positive.

13. The method of self-canceling a turn signal of claim 9, comprising further:
    measuring a rate of change of said outer velocity relative to said inner velocity; and
    deferring said cancellation of said turn signal while said rate of change is greater than a predetermined rate of change signal.

14. The method of self-canceling a turn signal of claim 9, comprising further: canceling said turn signal after said turn signal has been asserted by a driver for a period of time longer than a predetermined period of time.

15. A system of self-canceling a turn signal comprising:
    means for measuring an inner rotational velocity of an inner wheel;
    means for measuring an outer rotational velocity of an outer wheel;
    means for comparing a difference between said inner and outer velocities to a predetermined difference; and
    means for canceling a turn signal if said difference is less than said predetermined difference.

16. The system of self-canceling a turn signal of claim 15, comprising further means for signaling a turn while said difference is greater than said predetermined difference.

17. The system of self-canceling a turn signal of claim 15, comprising further means for deferring said cancellation of said turn signal for a predetermined period of time after said difference falls below said predetermined difference.

18. The system of self-canceling a turn signal of claim 15, comprising further:
    means for measuring a rate of change of said outer velocity relative to said inner velocity;
    means for measuring a sign of said rate of change; and
    means for deferring said cancellation of said turn signal while said sign is positive.

19. The system of self-canceling a turn signal of claim 15, comprising further:
    means for measuring a rate of change of said outer velocity relative to said inner velocity; and
    means for deferring said cancellation of said turn signal while said rate of change is greater than a predetermined rate of change signal.

20. The system of self-canceling a turn signal of claim 15, comprising further: means for canceling said turn signal after said turn signal has been asserted by a driver for a period of time longer than a predetermined period of time.

* * * * *